US005499434A

United States Patent [19]

Zdral

[11] Patent Number: 5,499,434

[45] Date of Patent: Mar. 19, 1996

[54] VALVE SPRING COMPRESSOR TOOL

[75] Inventor: Julian Zdral, Goodells, Mich.

[73] Assignee: Chrysler Corporation, Highland Park, Mich.

[21] Appl. No.: 333,920

[22] Filed: Nov. 3, 1994

[51] Int. Cl.[6] .......... B23P 19/04

[52] U.S. Cl. .......... 29/220

[58] Field of Search .......... 29/215, 219, 220, 29/267, 402.08, 426.5, 888.42, 888.46; 254/113, 131, 10.5

[56] References Cited

U.S. PATENT DOCUMENTS

| | | | |
|---|---|---|---|
| 1,268,480 | 6/1918 | Lockwood | 29/220 |
| 2,524,949 | 10/1950 | Applegate . | |
| 2,647,722 | 8/1953 | Koester | 254/113 |
| 4,176,435 | 12/1979 | Castoe . | |
| 4,446,608 | 5/1984 | Johnson | 29/220 |
| 5,365,647 | 11/1994 | Senkow | 29/220 |

*Primary Examiner*—Robert C. Watson
*Attorney, Agent, or Firm*—Kenneth H. MacLean

[57] ABSTRACT

A tool for compressing valve springs of overhead camshaft internal combustion engines in which the tool is provided with a J-shaped hook member for engaging the camshaft and utilizes the latter as a fulcrum and in which the hook member is formed with an extension for facilitating the engagement with and the removal from the camshaft.

10 Claims, 6 Drawing Sheets

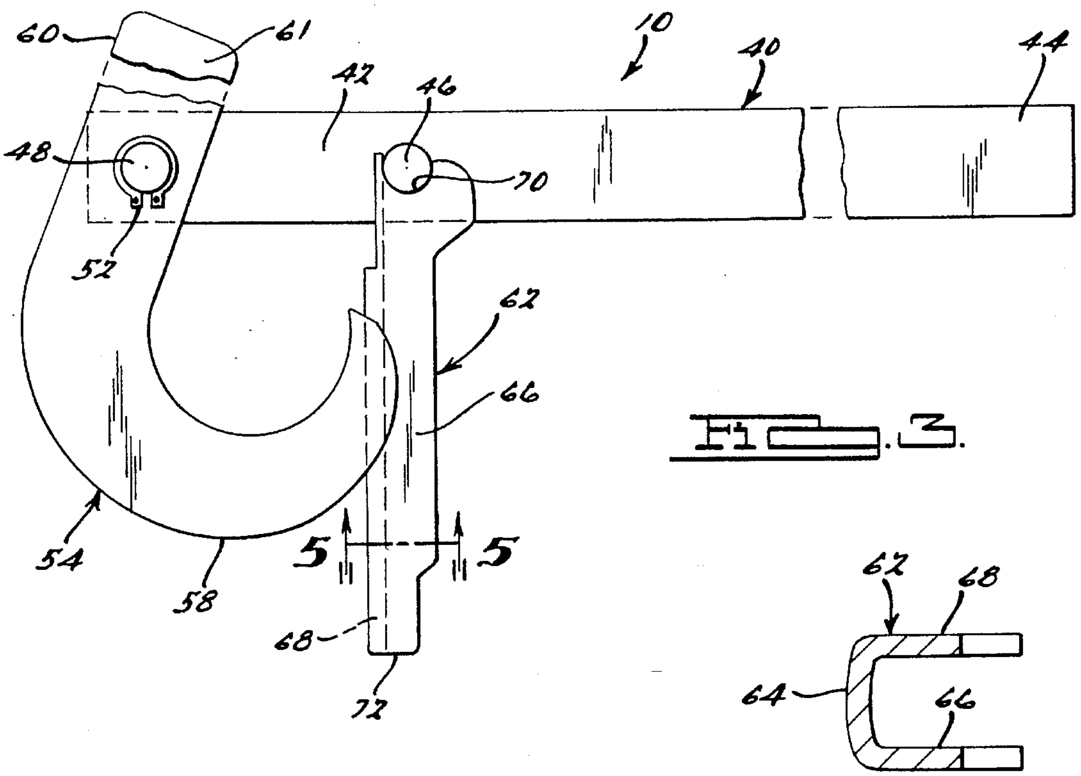
Fig. 3.
Fig. 5.
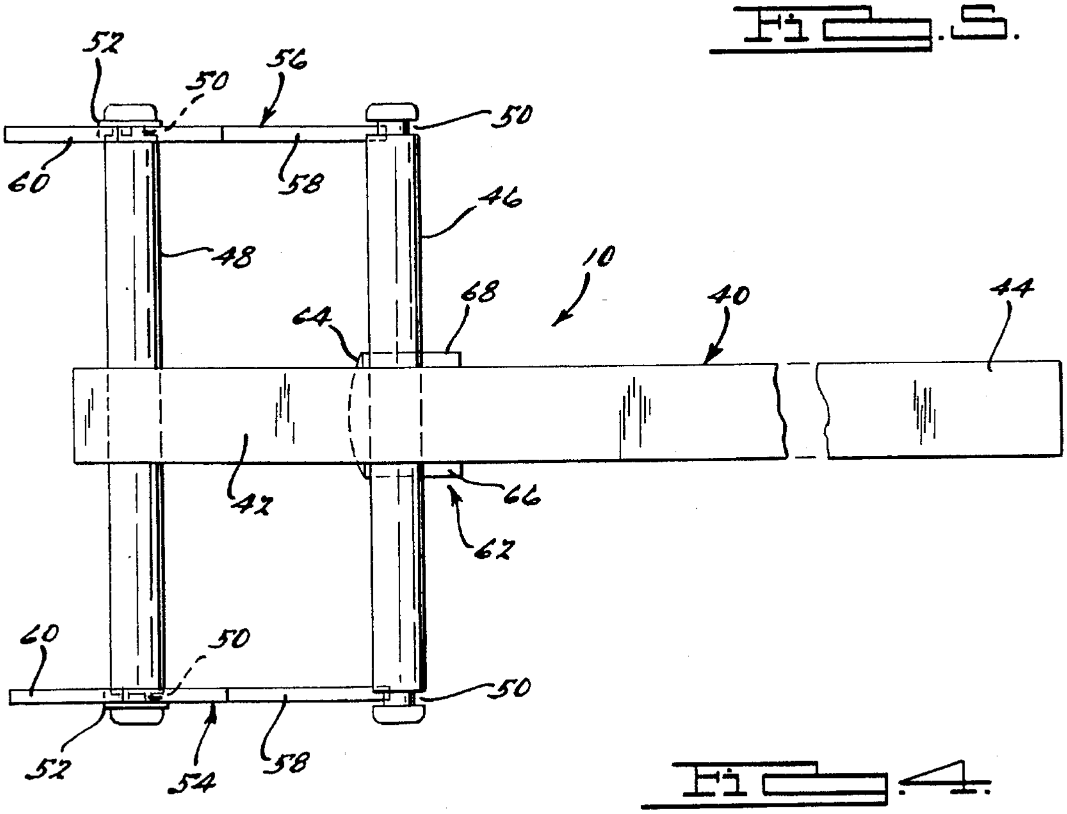
Fig. 4.

VALVE SPRING COMPRESSOR TOOL

FIELD OF THE INVENTION

This invention relates to internal combustion engines, in general, and more particularly concerns a tool for compressing the valve springs of such engines in which the valves are opened by one or more overhead camshafts located in the cylinder head of the engine.

BACKGROUND OF THE INVENTION

Various forms of tools and mechanisms have been proposed in the past for compressing valve springs of internal combustion engines so as to facilitate the removal and installation of rocker arms and lash adjusters. For example, U.S. Pat. No. 4,176,435, issued on Dec. 4, 1979 to John H. Castoe discloses a device comprising a tubular sleeve pivotally supported on an elongated leverage arm. The sleeve is formed with a working surface adapted to engage a valve spring while the leverage arm has one end engageable with a fixed support attached to the cylinder head. By application of a downward force at the free end of the leverage arm, the valve spring is compressed sufficiently to remove or install a rocker arm.

Another example of a tool proposed for use in compressing valve springs can be seen in U.S. Pat. No. 4,446,608, issued on May 8, 1984 in the name of Joel S. Johnson. This particular tool also includes a lever one end of which is provided with a depressor member, an attachment link, and a support leg, all three of which are pivotally connected to the lever at spaced points. In operation, a support bracket assembly provided with pivot shafts is first attached to the cylinder head. Afterwards, the attachment link is hooked under one of the pivot shafts of the support bracket assembly to provide a fulcrum and the depressor member is positioned in contact with the top of the a valve spring cap. This is followed by applying a downward force on the free end of the lever resulting in compression of the valve spring for removal of the rocker arm. In this case, the support leg serves as a stop that swings into engagement with a plate portion of the support bracket assembly to permit both hands of the operator to be used for removal or installation of the rocker arm, lash adjuster, and the valve itself, if desired.

U.S. Pat. No. 2,524,949, issued on Oct. 10, 1950 in the name of Chester P. Applegate is still another example of a tool which has been proposed for use in compressing the valve springs of an internal combustion engine. In this instance, the tool takes the form of a mechanism which is mounted on a work bench or table and includes appropriate brackets and clamps for supporting a cylinder head containing the valves. The mechanism is provided with a jack stand which is slidable along support shafts into a desired position above the valve that is to be removed after which the lever of the jack stand is depressed and the valve spring retainer is contacted. The valve head is then restrained from movement by a part of the jack stand located below the cylinder head and the lever is further depressed to compress the valve spring so as to allow removal of a pin and valve cap and finally permitting the valve spring to be removed from the cylinder head.

As explained above, each of the tools described above serves to compress a valve spring so as to facilitate the removal or installation of a rocker arm, lash adjuster and/or a valve of the cylinder head. However, one common problem with each of the tools is that the tool is required to be combined with a support bracket assembly of some type which must be fastened to the cylinder head. In each instance, the support bracket assembly must first be secured to the cylinder head before the tool can be used to perform its function, and afterwards it must be disassembled from the cylinder head once the job is completed. Accordingly, this not only increases the cost of the tool but also increases the time spent by the person using the tool to complete the job.

Another problem with the tool disclosed in the Johnson '608 patent mentioned above is that, in order to readily position or release the attachment link (which is shaped as a hook) from the pivot shafts, it would seem that one will need to reach under the tool and use his fingers to manually provide engagement with or release from the pivot shaft. Obviously, this could be difficult to accomplish at times particularly if the person using the tool has large fingers and is working in an area that is limited in size.

SUMMARY OF THE INVENTION

The tool according to the present invention alleviates the problems mentioned above by not requiring any form of support bracket assembly that must be attached to or removed from the cylinder head during the compression of the valve spring. Instead, the present invention utilizes a part of the cylinder head, namely the camshafts, as a support or fulcrum permitting the tool to depress the valve spring for facilitating the removal or installation of the rocker arm or lash adjuster. Another advantage of the present invention is that it can be used from the same side of an internal combustion engine for compressing the valve springs associated with double overhead camshafts. Thus, even with the double overhead camshaft engine being located transversely within the engine compartment of an automobile, both sets of valves can be serviced utilizing the present invention. This cannot be done with the tool shown in the '608 patent mentioned above and it is not clear how it could be done with the tools shown in the above-mentioned '435 patent or the '949 patent.

Another feature of the present invention is that it incorporates hook member means formed with an extension part normally located above the lever when the tool is being used for compressing a valve spring. This extension part can be used by the tool user to facilitate bringing a hook member into engagement with the camshaft and also allows the hook member to be easily removed from the camshaft. Also, the extension part of the hook member means provides a configuration which permits the hook member means to have sufficient area for accommodating repositioning means in the form of a plurality of openings. These openings permit the lever to be repositioned on the lever portion of the tool and thereby allow the tool to be used with different size engines.

More specifically, the tool according to the present invention for compressing valve springs is intended for use with internal combustion engines having overhead camshafts with each of the valve springs having an end cap operatively connected thereto. In the preferred form of the tool, a lever is provided having a handle end and a work end. A support rod is mounted in the lever along an axis which extends transversely to the longitudinal axis of the lever. The support rod is positioned adjacent the work end of the lever and hook member means are pivotally connected through the support rod to the lever at the work end thereof. The hook member means includes a curved foot portion and a generally straight leg portion the former of which is normally located below the longitudinal axis of the lever. The leg portion is formed with an extension part which is normally located above the longitudinal axis of the lever and can be manually grasped by the tool user's fingers for pivoting the hook member means, when desired. In addition, a depressor member is provided for the tool and has the upper end thereof formed with a first contact surface for removably maintaining engagement with the lever. The lower end of the depressor member is formed with a second contact surface for engagement with the end cap. The arrangement of the lever, hook member means, and the depressor member is such that the hook member means is adapted to have its curved foot portion initially placed in engagement with the underside of the overhead camshaft. Afterwards, the depressor member is positioned between the work end of the lever and the end cap of one of the valve springs while the camshaft cooperates with the hook member means and serves as a fulcrum. The handle end of the lever is then manually pivoted about the support rod to compress the valve spring through the end cap of one of said valve springs and, afterwards, the rocker arm associated with the compressed valve spring is removed. Finally, if needed, the extension part can be manually manipulated to facilitate removal of the curved portion of the hook member means from the camshaft.

In one form of the invention, the hook member means can be rotated 180 degrees about the support rod and used for compressing the valve springs associated with one or the other of the camshafts of a double overhead camshaft engine. In another form of the present invention, the work end of the lever is provided with a pair of rod members which are spaced along the longitudinal axis of the lever. The hook member means are designed to be removable from one of the support rods and transferred to the other for allowing the tool to compress the valve springs of a double overhead camshaft engine. In still another variation of the present invention, the work end of the lever is constructed along the lines of the first form of the invention except that, instead of having the depressor member engage the lever directly, a stub shaft is located on opposite sides of the hook member means and serves as the connecting element with one end of the depressor and the lever. In addition, if desired, each of the hook member means associated with each of the variations of the invention can be provided with a plurality of opening allowing the hook member means to be repositioned for use of the tool with different types of internal combustion engines.

The objects of the present invention are to provide a new and improved tool for compressing valve springs of a overhead camshaft internal combustion engines in which the tool is provided with J-shaped hook member means for engaging the camshaft and utilizes the latter as a fulcrum and in which the hook member means is formed with an extension for facilitating the engagement with and the removal from the camshaft of the hook member means; to provide a new and improved tool for compressing valve springs of double overhead camshaft engines from the same side of the engine so as to readily permit removal or installation of rocker arms or lash adjusters; to provide a new and improved tool for compressing valve springs of an internal combustion engine which does not require any supplementary pivot supports serving as fulcrum means to be attached to the cylinder head; to provide a new and improved tool for compressing valve springs of a double overhead camshaft engine that includes hook member means and a depressor member pivotally connectable to a lever and arranged so that their positions on the lever can be reversed so as to allow the tool to compress the valve springs activated by both camshafts from the same side of the engine; to provide a new and improved tool for compressing valve springs of a double overhead camshaft engine that includes hook member means pivotally connected to a lever and in which the hook member means are rotatable 180 degrees about their support shaft so as to permit the tool to compress the valve springs of one or the other of the camshafts for removal or installation of rocker arms or lash adjusters; to provide a new and improved tool for compressing valve springs of overhead camshaft engines in which the tool includes a lever pivotally supporting hook member means having a curved foot portion and a leg portion the latter of which is formed with a plurality of openings allowing the hook member means to be repositioned relative to the lever so that the tool can be used with different types of internal combustion engines for compressing valve springs; and to provide a new and improved tool for compressing valve springs of an engine in which parts of the tool which interact with the valve spring and a camshaft can be moved from one position to another so as to allow the valve springs of a double overhead camshaft engine be serviced without requiring the engine to be removed from the engine compartment of an automobile.

Other objects and advantages of the present invention will be apparent from the following detailed description when taken with the drawings in which

BRIEF DESCRIPTION OF THE DRAWINGS

FIG. 3 is a side elevational view of the tool seen in FIGS. 1 and 2;

FIG. 4 is a plan view of the tool seen in FIG. 3;

FIG. 5 is a sectional view taken on line 5—5 of FIG. 3;

DETAILED DESCRIPTION OF THE INVENTION

Figure 1:
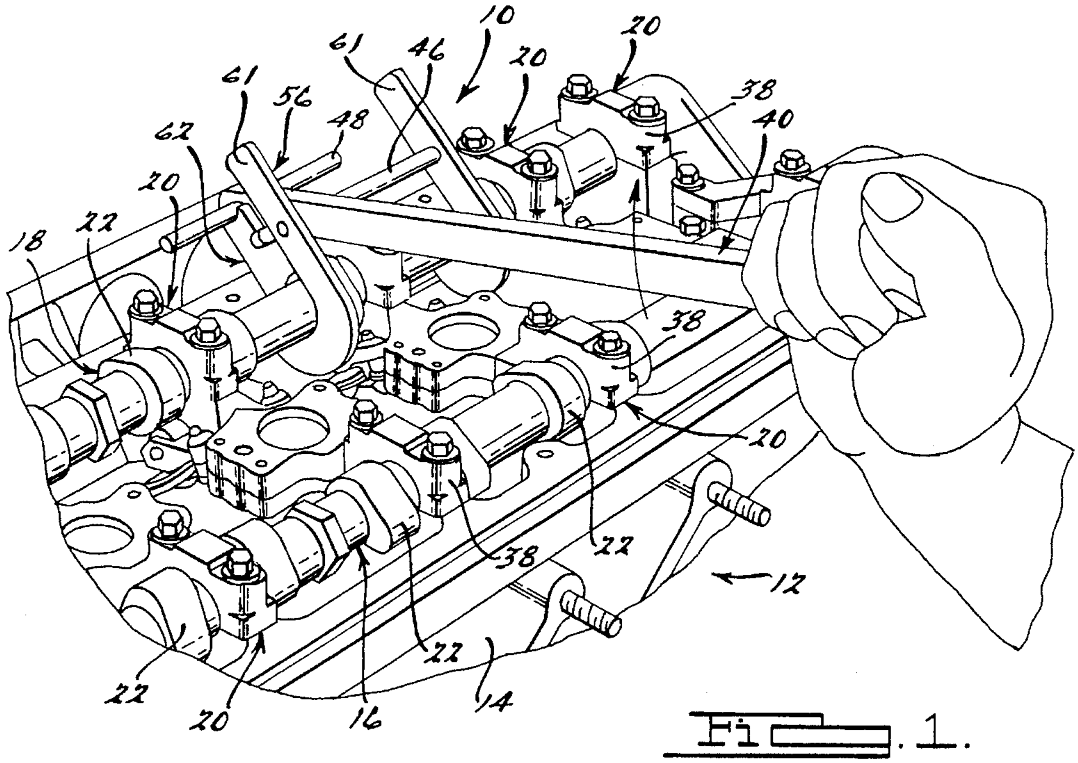
FIG. 1 is a fragmentary perspective view showing one form of a tool made in accordance with the present invention being used for compressing a valve spring associated with one of the camshafts of a double overhead camshaft engine so as to facilitate the removal of a rocker arm.
Figure 2:
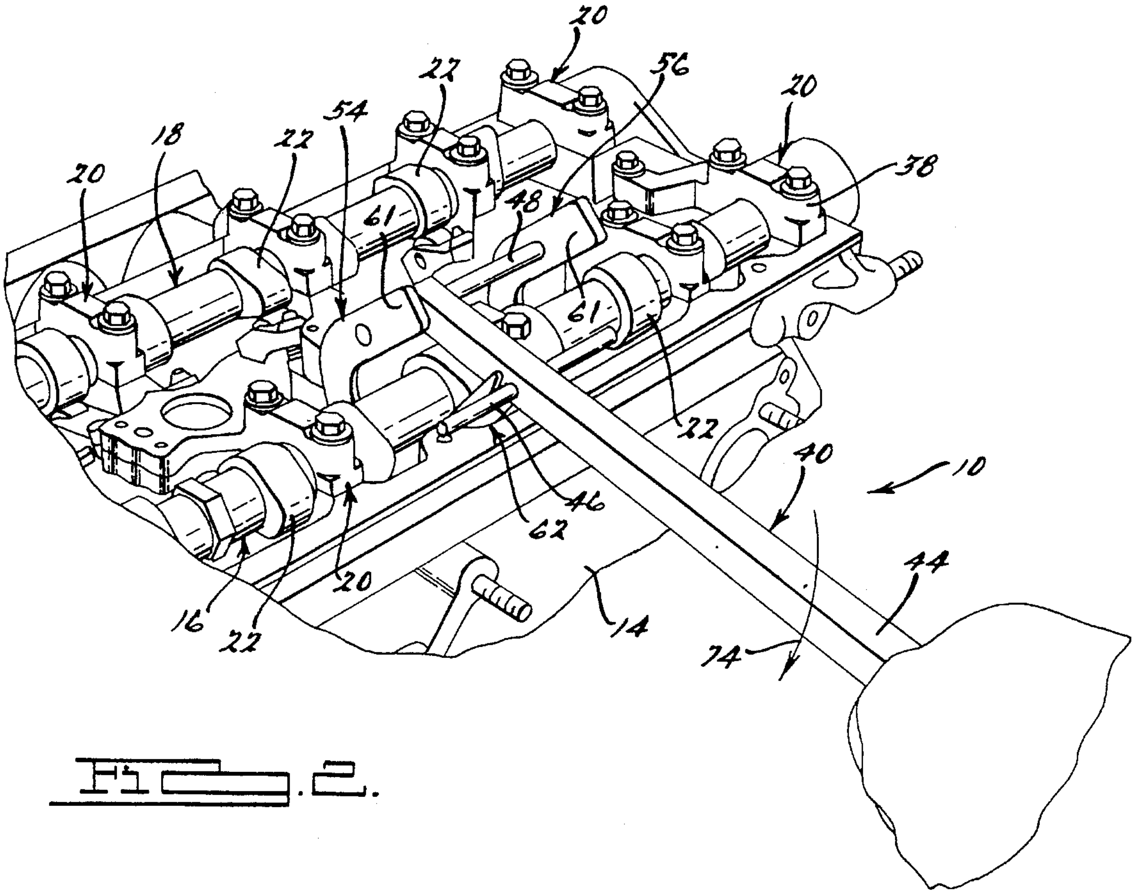
FIG. 2 is a view similar to that seen in FIG. 1 utilizing the same tool for compressing a valve spring associated with the other of the camshafts of a double overhead camshaft engine for the same purpose.

Referring now to the drawings and more particularly to FIGS. 1 and 2 thereof, one form of a tool made according to the invention is shown (indicated by reference numeral 10) being utilized for compressing the valve spring of a double overhead camshaft engine 12. As seen in FIGS. 1 and 2, the cylinder head 14 of the double overhead camshaft engine 12 is shown in which the camshaft or valve cover (not shown) is removed from the cylinder head 14 so as to expose overhead camshafts 16 and 18 each of which is supported by a plurality of bearing members 20. Each of the camshafts 16 and 18 is formed with a plurality of lobes 22 along its length. Although not seen in FIGS. 1 and 2, but can be seen in FIGS. 6, 7 and 12, each of the lobes 22 operatively engages a rocker arm 24 one end of which is in contact with a stem portion of a valve 26 and the other end of which is in contact with a hydraulic lash adjuster 28. Thus, during rotation of each camshaft, the valves 26 are opened as the high point of the lobe contacts a roller portion 30 of the rocker arm 24 and the valves 26 are maintained closed by an associated spring 32 encircling the valve stem when the lobe 22 is located in the positions seen in FIGS. 6, 7, and 12. In each instance, one end of the valve spring 32 contacts an end cap 34 which is locked to the end of the valve stem.

In the event that the rocker arms 24, valve springs 32, or lash adjusters 28 of the disclosed engine 12 seen in FIGS. 1, 2, 6, 7, and 12 need to be serviced, one method of doing so would be to unscrew the bolts 36 fastening the upper bearing caps 38 of the bearing members 20 to the cylinder head so as to permit the camshafts 16 and 18 to be removed. Another method would be to depress the individual valve springs 32 directly so as to cause the rocker arm 24 to lose contact with the associated camshaft. The latter method would then permit the opposed ends of the rocker arm 24 to be removed from engagement with the valve 26 and the lash adjuster 28. To this end, the tool according to the present invention is intended for use in practicing the second method, i.e. depressing the valve springs 32 directly without need for removal of the associated camshaft.

More specifically, the tool 10 according to one form of the present invention can be seen in FIGS. 1–5 and includes an elongated lever member 40 made of steel that is uniform in size along its length and is generally rectangular in cross section. The lever member 40 has a work end 42 and a handle end 44. The work end 42 of the lever member 40 supports a pair of identical cylindrical rods 46 and 48 each of which is located along an axis which is normal to the longitudinal center axis of the lever member 40. Each of the rods 46 and 48 is located in a circular opening formed in the lever member 40 that allows the associated rod to move axially relative to the lever member 40 and vice versa. In addition, each of the rods 46 and 48 have the opposed ends thereof formed with a circular undercut or groove 50 adapted to receive a snap ring 52 which, as seen in FIG. 3, serves to prevent a pair of J-shaped hook members 54 and 56 from being released from the associated rod.

As best seen in FIGS. 3 and 4, the pair of hook members 4 and 56 are identical in size and configuration and each is capable of pivoting about the associated support rod relative to the lever member 40. Also, each of the hook members 54 and 56 is capable of being moved along the associated rod. In addition, each hook member 54 and 56 includes a curved foot portion 58 and a relatively straight leg portion 60. As seen in FIG. 3, the foot portion 58 is normally located below the longitudinal center axis of the lever member 40 while the leg portion 60 has an extension portion 61 thereof that normally extends above the longitudinal center axis of the lever member 40.

The tool 10 also includes a depressor member 62 which, as seen in FIGS. 3 and 5, is generally U-shaped in cross section and comprises a back wall 64 integrally formed with a pair of laterally spaced side walls 66 and 68. The upper end of the depressor member 62 has the side walls 66 and 68 thereof formed with axially aligned circular cut-out portions 70 which are shown removably engaging the rod 46 as seen in FIGS. 3 and 4. Thus, as seen in FIG. 4, the upper end to the side walls 66 and 68 straddle the lever member 40 when in contact with the rod 46. It will be noted also that the lower end of the depressor member 62 is formed with a U-shaped contact surface 72 which serves to engage the end cap 34 of each valve 26 as will be more fully described below.

When it is desired to use the tool 10 described above for removal of a rocker arm 24 or a lash adjuster 28, the hook members 54 and 56 are first positioned with their curved foot portions 58 located below a camshaft such as camshaft 16 as seen in FIG. 2. At times, it could be difficult to properly position the foot portions 58 of the hook members 54 and 56 by having the tool user merely bring the hook members 54 and 56 in contact with the camshaft 16 through movement of the lever member 40. If this should occur, the tool user can manually grasp the extension portion 61 of each of the hook members 54 and 56 with the fingers of one hand while holding the handle portion 44 of the lever member 40 with the other hand. Once the hook members 54 and 56 are properly connected to the camshaft 16, the tool user can then pivot the lever member 40 upwardly about the rod 48 and have the cut-out portion 70 of the upper end of the depressor member 62 engage the other rod 46 mounted to the lever member 40 as seen in FIG. 3. While maintaining the depressor member 62 in contact with rod 46, the contact surface 72 of the depressor member 62 can be manually guided into contact with the end cap 34 of the valve 26 with the side walls 66 and 68 straddling the valve stem. Once contact is made with the end cap 34, the handle end 44 of the lever member 40 is pressed downwardly in the direction of the arrow 74 as seen in FIG. 2. This causes the camshaft 16 to serve as a fulcrum permitting the valve spring 32 to be compressed and causes the rocker arm 24 to lose contact with the camshaft 16 as explained above. The tool user can then reach down into the cylinder head 14 to remove the rocker arm 24 and/or the lash adjuster 28. After the rocker arm 24 and/or the lash adjuster 28 are removed from the depressed valve spring 32, the tool user can readily release the hook members 54 and 56 from the camshaft 16 by again grasping the extension parts 61 of the hook members 54 and 56 and pivoting same about their support axis to clear the camshaft 16.

It will be noted that the tool user can not only depress the valve springs 32 associated with the camshaft 16 by following the steps described above, but he(she) can also depress the valve springs 32 associated with the other camshaft 18 while remaining on the same side of the engine 12. In order to use the tool 10 with the other camshaft 18, the tool user need only remove each of the snap rings 52 from the rod 48 followed by removal of the hook members 54 and 56 from the rod 48. The hook members 54 and 56 are then placed on the opposed ends of the rod 46 with the foot portion 58 having the curved part thereof facing a direction opposite (as seen in FIG. 1) to that when mounted on the rod 48. The snap rings 52 are then placed in the grooves 50 of the other rod 48 so as to maintain the hook members 54 and 56 thereon and the tool 10 then is ready for use with the other camshaft 18. In this case, the hook members 56 and 56 again will have the curved foot portion 58 placed below the camshaft 18 after which the depressor member 62 is combined with the rod 48 in the manner as previously combined with the rod 46 as described above. Once the contact end 72 of the depressor member 62 engages the end cap 34 of the valve 26 having the spring 32 to be depressed, the tool user will then raise the handle end 44 of the lever member 40 upwardly as seen in FIG. 1. In this instance, the camshaft 18 serves as the fulcrum permitting the depressor member 62 to compress the valve spring 32 and allow removal of the rocker arm 24 and/or lash adjuster 28.

By permitting the lever member 40 to move sideways along each of the rods 46 and 48, the tool user is able to position the lever member 40 so that parts of the cylinder head 14 do not interfere with the use of the tool 10. For example, as seen in FIG. 2, the lever member 40 has been shifted slightly to the left of the center of the rod 48 so that the adjacent bearing does not interfere with the downward movement of the lever member 40 and prevent the desired compression of the valve spring 32. Similarly, by having the hook members 54 and 56 movable along the length of the rods 46 and 48 to different positions of a camshaft, one is able to avoid obstacles which may interfere with the use of the tool 10.

Figure 6:
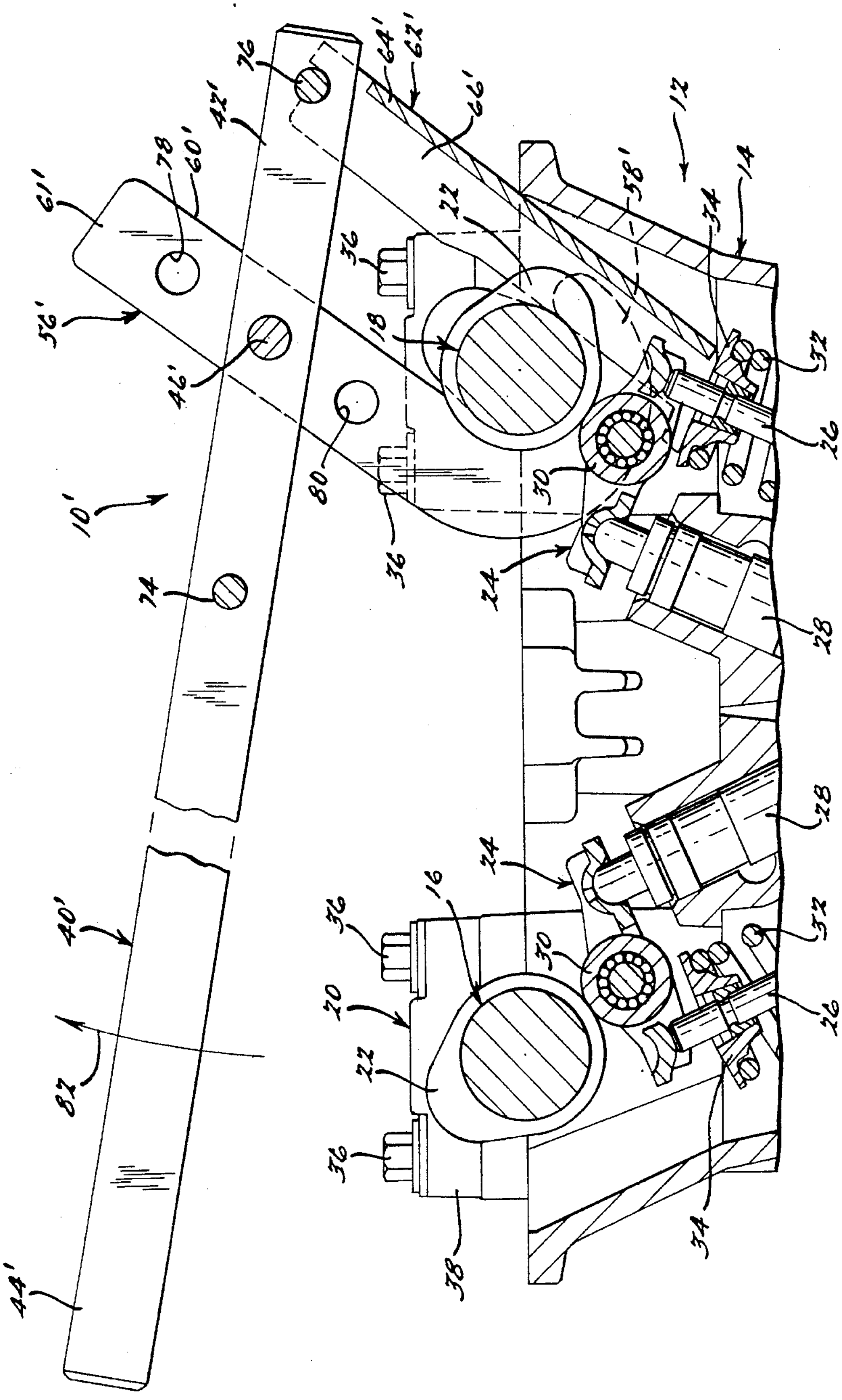
FIG. 6 is a fragmentary cross sectional view of the double overhead camshaft engine seen in FIGS. 1 and 2 and in which one of the valve springs is to be depressed by a modified form of the tool made in accordance with the present invention.
Figure 7:
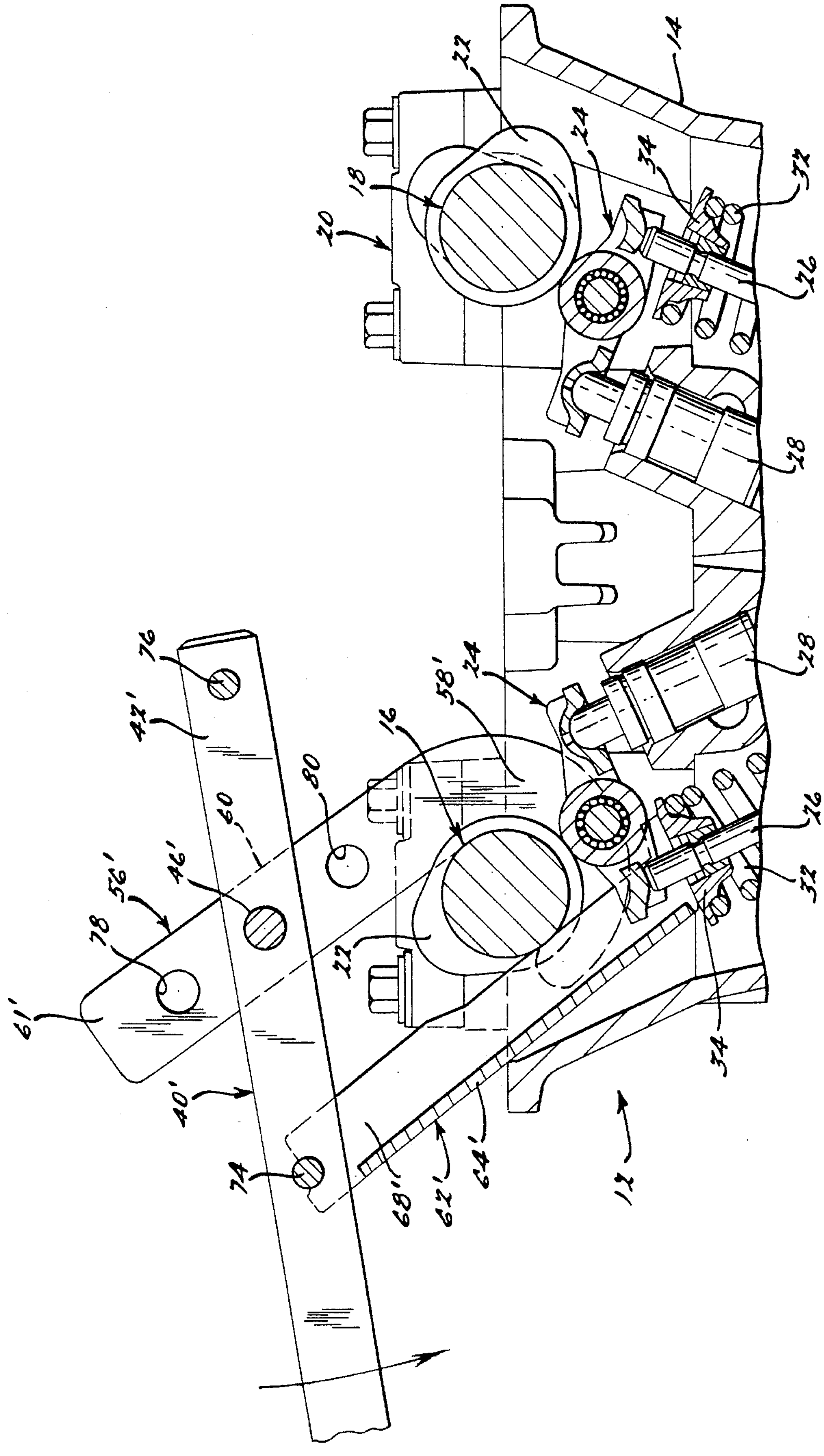
FIG. 7 is a view similar to that in FIG. 6 showing the same tool seen in FIG. 6 connected to the other camshaft of the double overhead camshaft engine preparatory to compression of a valve spring associated with said other camshaft.
Figure 8:
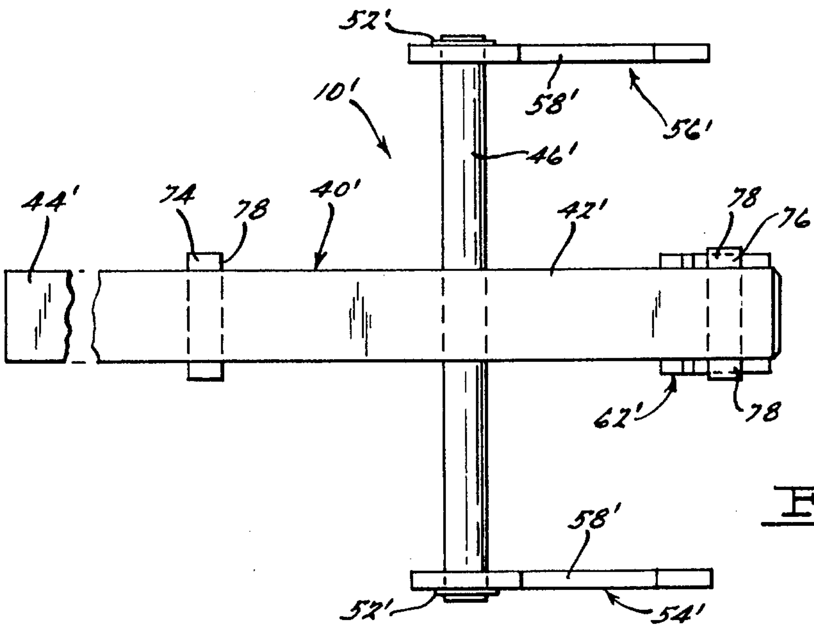
FIG. 8 is a plan view of the tool seen in FIGS. 6 and 7 with the parts positioned for compressing the valve spring of the other camshaft as seen in FIG. 7.
Figure 9:
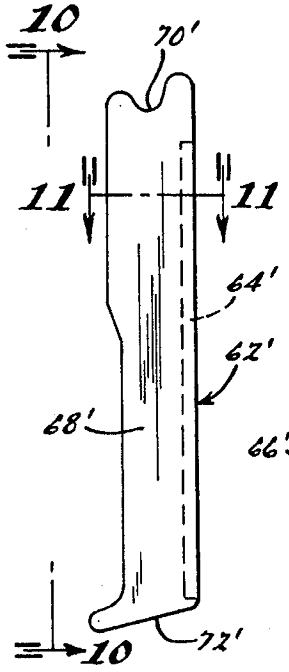
FIG. 9 is a side elevational view of a depressor member which forms a part of the tool seen in FIGS. 6 and 7.

FIGS. 6–11 disclose another form a tool 10' according to the present invention in which parts corresponding to those of the tool 10 seen in FIGS. 1–5 are identified by the same reference numerals except primed. In this case the lever member 40' also has a handle end 44' and a work end 42', However, the work end 42' of the tool 10' differs from the work end 42 of the tool 10 in that it includes only one elongated rod 46' which, as seen in FIG. 8, is displaced a predetermined distance from the terminal end of the lever member 40' at the work end 42' thereof. As seen in FIGS. 6 and 8, the rod 46' is located midway between a pair of stub shafts 74 and 76 and, as in the case of the rods 46 and 48 of tool 10, allows the lever member 40' to move sideways along the rod 46'. As seen in FIGS. 8 and 9, each of the stub shafts 74 and 76 is fixed in position relative to the lever member 40' and has opposed extending parts 78 which are adapted to connect with the curved cut-out portions 70' formed with the upper end of a depressor member 62' forming a part of the tool 10'.

As seen in FIGS. 6 and 8, the tool 10' includes a pair of identical U-shaped hook members 54' and 56' which are pivotally supported by the rod 46' normally at points located adjacent the opposite ends of the rod 46'. As with the tool 10, the hook members 54' and 56' are prevented from being released from the rod 46' by a snap ring 52' located in a groove cut into each end of the rod 46'. Each of the hook members 54' and 56' includes a curved foot portion 58' and a relatively straight leg portion 60' which, as with the hook members 54 and 56 of tool 10, has an extension part 61' normally located above the longitudinal center axis of the lever member 40'. In this instance, the leg portion 60' of each of the hook members 54' and 56' is formed with two additional circular openings 78 and 80 one of which is located above the rod 46' and the other is located below the rod 46' for purposes which will be explained hereinafter.

Figure 10:
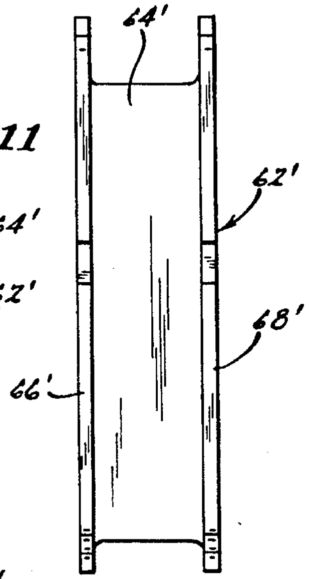
FIG. 10 is a view of the depressor member seen in FIG. 9 taken on line 10—10 thereof.
Figure 11:
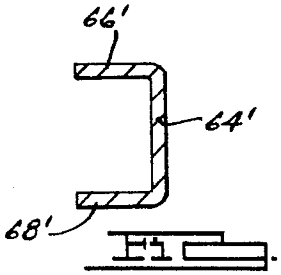
FIG. 11 is a cross sectional view of the depressor member seen in FIG. 9 taken on line 11—11 thereof.

The depressor member 62' referred to above, can best be seen in FIGS. 9–11. In this regard, the depressor member 62' resembles the depressor member 62 of tool 10 in that it also is U-shaped in cross section and includes a back wall 64' and a pair of laterally spaced and parallel side walls 66' and 68'. The depressor member has the upper end of each of the side walls 66' and 68' formed with the curved cut-out portion 70' referred to above. The lower end of the depressor member 62' is formed with a contact surface 72' which, in this case, is inclined downwardly at a predetermined angle relative to the back wall 64' of the depressor member 62'.

Use of the tool 10' described above for removing the rocker arms 24 and/or the lash adjusters 28 of a double overhead camshaft engine is illustrated in FIGS. 6 and 7. Thus, as seen in FIG. 6, the curved foot 58' of the hook members 54' and 56' is positioned beneath the camshaft 18 as explained above with respect to the tool 10. The upper side walls 66' and 68' of the depressor member 62' straddle the free end of the lever member 40' with the curved cut-out portions 70' engaging the exposed ends 78 of the stub shaft 76 and the contact surface 72' at the lower end of the depressor member 62' engaging the end cap 34 of the valve 26. By having the contact surface 72' inclined as described above, full contact with the end cap 34 can be realized. As with the tool 10, the camshaft 18 acts as a fulcrum when the tool user raises the handle end 44' of the lever member 40' in the direction of the arrow 82. The upward movement of the handle end 44' of the lever member 40 causes the lever member 40' to pivot clockwise about the longitudinal center axis of the rod 46' resulting in the stubshaft 76 pivoting downward in a clockwise direction about the center axis of the rod 46'. The downward movement of the stubshaft 76, in turn, causes through depressor member 62' a downward movement of the end cap 34 with resultant compression of the valve spring 32 so as to allow removal of the rocker arm 24 and/or the lash adjuster 28.

As with the tool 10, the tool 10' can also be used from the same side of the engine 12 for compressing the valve springs 32 associated with the other camshaft 16. In order to do so, the tool user need only rotate the hook members 54' and 56' 180 degrees from the position shown in FIG. 6 to that seen in FIG. 7. A quick way to do this would be to merely turn the lever member 40' upside down permitting the curved foot portions 58' of the hook members 54' and 56' to rotate to the positions seen in FIG. 7. Once so positioned, the tool user can proceed to compress the valve springs 32 associated with camshaft 16 as explained above. Moreover, once the tool user has removed the rocker arm 24 and/or the lash adjuster 28 associated with camshaft 16, he can remove the hook members 54' and 56' from the camshaft 16 by manually grasping the extension parts 61' of the hook members 54' and 56' thus directing each curved foot portion 58' along a path of movement which quickly clears the hook member from all obstacles it might encounter. In addition, in the event the tool 10' is to be used with another engine which may require the curved foot portion 58' to be closer to or further from the lever member 40', each of the hook members 54' and 56' is provided with the additional circular holes or openings 78 and 80. Thus, each of the hook members 54' and 56' can be removed from the rod 46' by first removing the snap rings 52' followed by relocation of the rod 46' in the appropriate opening 78 and 80 dictated by the particular engine.

Figure 12:
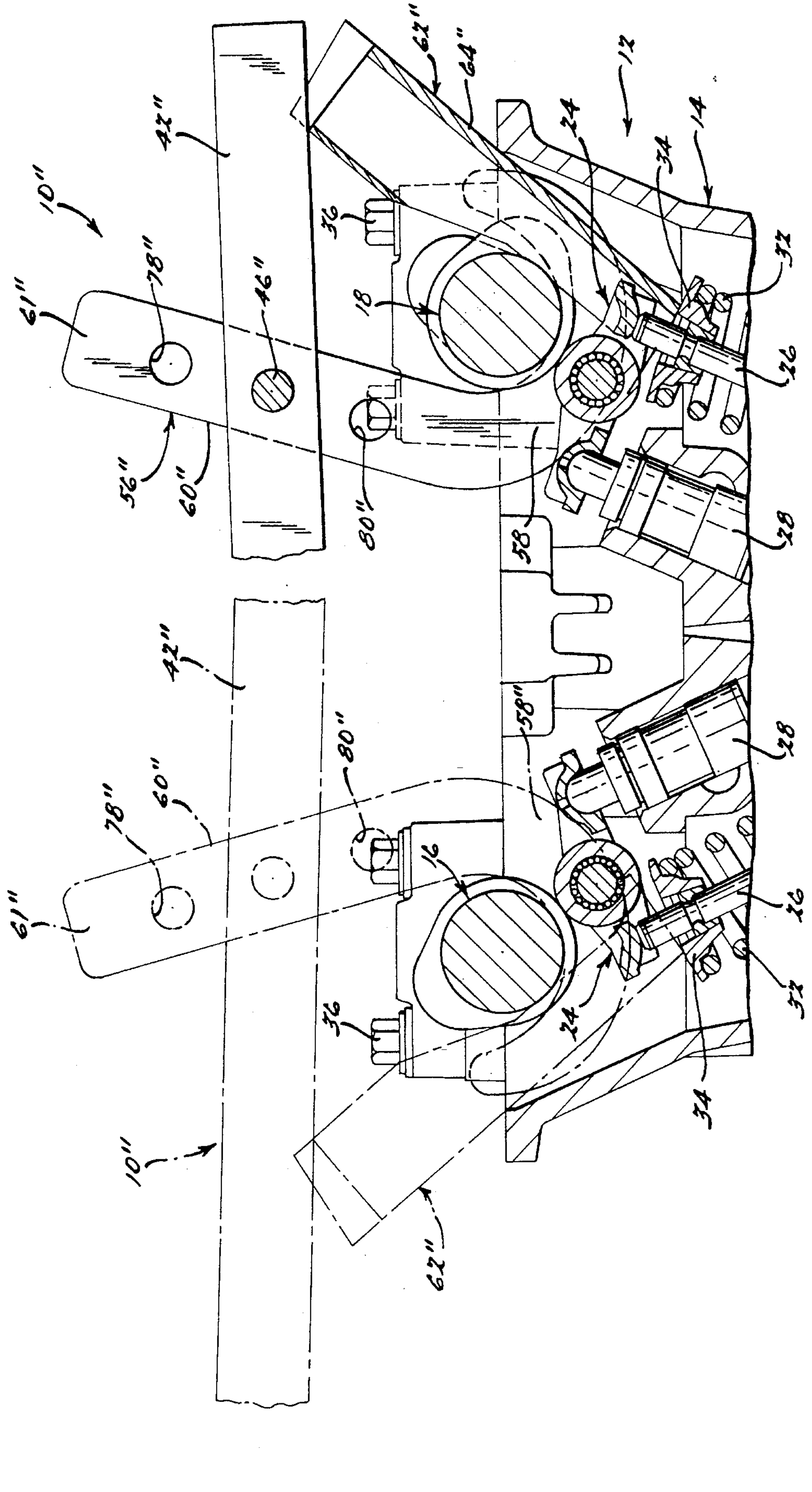
FIG. 12 is a fragmentary cross section view of the same double overhead camshaft engine seen in FIGS. 6 and 7 and in which one valve spring associated with one of the camshafts of the engine is to be compressed by another modified form of the tool made in accordance with the present invention.

FIG. 12 shows still another form of the tool according to the present invention and, in this instance, the parts corresponding to the same parts of the tool 10' seen in FIGS. 6–11 are identified by the same numerals except double primed. In addition, it will be noted that the lever member 40" and the hook members 54" and 56" as well as the rod 46" supporting the hook members 54" and 56" are identical in configuration to the corresponding parts of the tool 10' seen in FIGS. 6–8. It will also be noted that these parts of tool 10" function in the same manner as the corresponding parts of tool 10'. The only difference in these parts of tool 10" being the lack of the stubshafts 74 and 78 found in the tool 10' and a difference in the design of the upper end of depressor member 62".

Figure 13:
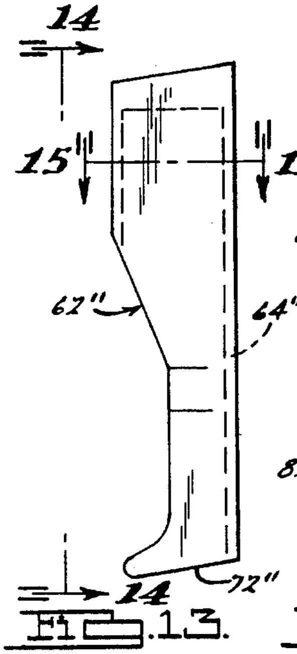
FIG. 13 is a side elevational view of a depressor member which forms a part of the tool seen in FIG. 12.
Figure 14:
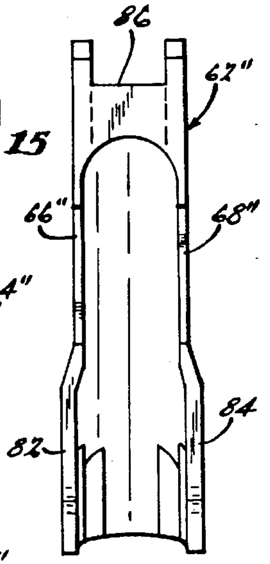
FIG. 14 is a view of the depressor member seen in FIG. 13 taken on line 14—14 thereof.
Figure 15:
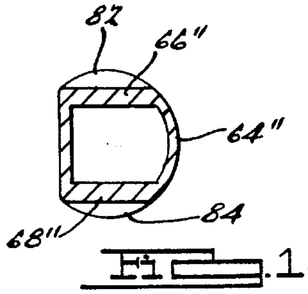
FIG. 15 is a cross sectional view of the depressor member seen in FIG. 13 taken on line 15—15 thereof.

In this regard the depressor member 62" as seen in FIGS. 13–15, is partially tubular in configuration having a curved back wall 64" integral with planar side walls 66" and 68" at its upper end that merge with curved side walls 82 and 84 at its lower end. In addition the upper end of the depressor member 62" does not have a curved cut-out portion as provided in the tools 10 and 10'. Instead, the upper end of the depressor member 62" has a U-shaped pocket 86, as seen in FIG. 14, into which the lower part of the lever member 40" is received as seen in FIG. 12 when the tool 10" is being used for compressing valve springs 32 of an internal combustion engine 12. In this regard, the right-hand full-line drawing of the tool 10" seen in FIG. 12, shows the hook members 54" and 56" in engagement with the camshaft 18 with the upper end of the depressor member 62" contacting the lever member 40". Obviously, inasmuch as the upper end of the depressor member 62" merely contacts the lower end of the lever member 40", the angle at which such contact occurs must be such as to allow sufficient friction to maintain the fixed engagement between the two contacting parts without incurring slippage. This, of course, will be determined by the tool user as force is being applied to the depressor member 62" through the lever member 40".

With the various parts of the tool 10" being positioned as seen in full-lines in FIG. 12, the tool user will raise the handle end (not shown) of the lever member 40" causing the contact surface 72" of depressor member 62" to press the end cap 34 downwardly resulting in compression of the valve spring 32. Once this is done, the tool user can reach down into the cylinder head 14 and remove the rocker arm 24 and/or the lash adjuster 28 associated with camshaft 18 as explained above with respect to the tools 10 and 10'. When it is desired to remove the rocker arms 24 and/or the lash adjuster 18 associated with the other camshaft 16, the tool user will turn the tool 10" upside down in the manner as explained in connection with the tool 10'. This will then permit the tool user to use the tool 10" from the same side of the engine as seen in dotted lines in FIG. 12 for compressing the valve springs 32 associated with camshaft 16.

Although the tools 10, 10' and 10" described above are shown compressing the valve springs of a double overhead camshaft engine, the tools 10, 10' and 10" are also usable as described on a single overhead camshaft engine. In addition, although each of the tools 10, 10' and 10" of the present invention utilize a pair of hook members for distributing forces applied to the camshaft during use, it would be possible to use a single hook member in which the curved foot portion has the surface contacting the camshaft enlarged to distribute forces and thereby accomplish the same purpose. Finally, it will be noted that the spacing of the holes 78, 80 and 78" 80" relative to the rod 46' and 46" respectively, will depend upon the design of the engines with which the tool is to be used. In other words, the position of the holes 78, 80 and 78", 80" will be predetermined for a particular engine, and the hook members 54" and 56" will be repositioned to the appropriate opening when the tool 10" is used with that particular engine.

Various changes and modifications can be made in the construction of the above described tool without departing from the spirit of the present invention. Such changes and modifications are contemplated by the inventor and he does not wish to be limited except by the scope of the following claims.

The embodiments of the invention in which an exclusive property or privilege is claimed are defined as follows:

1. A tool for compressing valve springs for removal of a rocker arm contacting an overhead camshaft and at least partially located in underlying relationship to the camshaft in the engine cylinder head of an internal combustion engine, said valve springs each having an end cap operatively connected thereto, said tool comprising a lever member having a handle end and a work end, a support rod mounted in said lever member along an axis which extends transversely to the longitudinal axis of said lever member, said support rod being positioned at said work end of said lever member, hook member means pivotally connected to said support rod, said hook member means including a curved foot portion and a leg portion having an extension part, said curved foot portion located below said lever member and said extension part of said leg portion located above said lever member during a spring compression operation, a depressor member having one end thereof formed with a first surface for maintaining contact with the work end of said lever member, the other end of said depressor member being formed with a second surface for contact with said end cap, the arrangement being such that said hook member means is adapted to have the curved foot portion thereof placed in engagement with the underside of said overhead camshaft whereby said curved foot portion engages a substantial portion of the camshaft's undersurface which serves as a fulcrum for said lever member while said second surface of said other end of said depressor is engaging the end cap of one of said valve springs so that said handle end of said lever member can be pivoted about the support rod to compress the valve spring contacted by said end cap of one of said valve springs so as to remove the rocker arm associated with said one of said valve springs.

2. The tool of claim 1, wherein said leg portion is provided with a plurality of openings for repositioning said hook member means on said rod.

3. The tool of claim 1, wherein said hook member means comprises a pair of J-shaped hook members mounted at the opposed ends of said support rod.

4. The tool of claim 3, wherein said lever member includes a second support rod and said hook members can be moved from one of the support rods to the other support rod so as to allow the tool to be used from the same side of said engine for compressing valve springs associated with both camshafts of a double overhead camshaft type engine.

5. A tool for use from a first side only of two sides of an internal combustion engine for compressing valve springs associated with a first overhead camshaft and second overhead camshaft located in a side by side relationship in the engine cylinder head for removal or installation of rocker arms which are at least partially located in underlying relationship to a camshaft, each of said valve springs having an end cap operatively connected thereto, said tool comprising a lever member having a handle end and a work end, a support rod mounted in said lever member at said work end along an axis which extends transversely to the longitudinal axis of said lever member, a pair of J-shaped hook members pivotally connected to said rod at opposed sides of said lever member and having a first position for engagement with said first overhead camshaft from said one side of the engine and an alternate second position formed by rotating said pair of J-shaped hook members 180 degrees about said support rod and turning said lever member over 180 degrees for engagement with said second overhead camshaft from said one side of the engine, a depressor member having one end thereof formed with a first surface for maintaining contact with said work end of said lever member so that said first surface of said depressor member contacts the lever member forwardly of said rod when said hook members are in said first position and contacts said lever member rearwardly of said rod when the hook members are in said second position, the other end of said depressor member being formed with a second surface for contact with said end cap when said hook members are in said first position or in said second position, the arrangement being such that when said hook members are in said first position and in said second position, said first overhead camshaft and said second overhead camshaft respectively serve as a fulcrum while said second surface of said depressor engages the end cap of one of said valve springs so that pivotal movement of said handle end of said lever member about a respective camshaft compresses the valve spring contacted by said end cap.

6. A tool for use from a first side only of two sides of an internal combustion engine for compressing valve springs associated with a first overhead camshaft and second overhead camshaft located in a side by side relationship in the engine cylinder head for removal or installation of rocker arms which are at least partially located in underlying relationship to a camshaft, each of said valve springs having an end cap operatively connected thereto, said tool comprising a lever member having a handle end and a work end, a support rod mounted in said lever member at said work end along an axis which extends transversely to the longitudinal axis of said lever member, a pair of J-shaped hook members, each of said hook members including a curved foot portion and a leg portion having an extension part, said foot portion located below said lever member and said extension foot of said leg portion located above said lever member while the tool is being used to compress a spring, said hook members being pivotally connected to said rod at opposed sides of said lever member and having a first position for engagement with said first overhead camshaft from said one side of the engine and an alternate second position formed by rotating said pair of J-shaped hook members 180 degrees for engagement with said second overhead camshaft also from said one side of the engine, a depressor member having one end thereof formed with a first surface for removably maintaining contact with said work end of said lever member so that said first surface of said depressor member contacts the lever member forwardly of said rod when said hook members are in said first position and contacts said lever member rearwardly of said rod when the hook members are in said second position, the other end of said depressor member being formed with a second surface for contact with said end cap when said hook members are in said first position or in said second position, the arrangement being such that when said hook members are in said first position and in said second position, said first overhead camshaft and said second overhead camshaft respectively serve as a fulcrum while said second surface of said depressor engages the end cap of one of said valve springs so that pivotal movement of said handle end of said lever member about a respective camshaft compresses the valve spring contacted by said end cap.

7. The tool of claim 6, wherein said leg portion is provided with a plurality of openings for repositioning said pair of hook members on said support rod.

8. The tool of claim 7, wherein said depressor member includes a back wall integral with a pair of side walls.

9. The tool of claim 8, wherein said second surface of said depressor member is inclined relative to said back wall.

10. The tool of claim 9, wherein said one end of said depressor member is formed with a pocket which receives a portion of said lever member.

* * * * *